United States Patent [19]
DeJonge

[11] Patent Number: 5,878,916
[45] Date of Patent: Mar. 9, 1999

[54] METERED DOSAGE UNDIRECTIONAL TRACKED PUMPED DISPENSER

[76] Inventor: Stuart W. DeJonge, 20 Schuler La., Easton, Pa. 18042

[21] Appl. No.: 943,587

[22] Filed: Oct. 3, 1997

[51] Int. Cl.[6] .............................. B65D 83/40; B67D 5/32
[52] U.S. Cl. ........................................ 222/153.13
[58] Field of Search ................ 222/153.13, 384, 222/402.11, 321.7, 321.9, 153.11

[56] References Cited

U.S. PATENT DOCUMENTS

| | | | |
|---|---|---|---|
| 3,422,996 | 1/1969 | Lipman | 222/402.11 |
| 4,065,036 | 12/1977 | Kirk, Jr. | 222/153.13 |
| 4,589,573 | 5/1986 | Tada | 222/153.13 |
| 4,589,574 | 5/1986 | Foster | 222/153.13 |
| 4,871,092 | 10/1989 | Maerte | 222/153.13 |
| 4,915,601 | 4/1990 | von Schuckmann | 222/153.13 X |
| 4,944,429 | 7/1990 | Bishop et al. | 222/153.13 |
| 5,096,094 | 3/1992 | Guilbert | 222/153.13 |
| 5,277,334 | 1/1994 | Malinconico . | |
| 5,335,830 | 8/1994 | Cater | 222/153.13 |
| 5,615,806 | 4/1997 | Grothoff | 222/153.13 |
| 5,772,080 | 6/1998 | De Pous et al. | 222/153.13 X |

*Primary Examiner*—Kevin P. Shaver
*Attorney, Agent, or Firm*—Kenneth P. Glynn, Esq.

[57] ABSTRACT

A metered dosage unidirectional tracked pump dispenser of the present invention comprises a liquid pump which includes a pump handle and nozzle, and a circular housing containing a reciprocal pump mechanism which is connected to the nozzle. A circular sleeve, which may be a container neck, the housing, a pump handle wall or a separate component, is included and has either at least one guide protrusion, or has at least one track located on the said sleeve, the track being adapted to receive the guide protrusion. The track has a virtual continuous loop for control of pump cycles. There are also at least two vertical paths parallel to and separate from each other. One of the vertical paths has upward flowing ratchets which permit movement of a guide protrusion upwardly and prohibit downward movement. The other of the vertical paths has downward flow ratchets which permit movement of a guide protrusion downwardly and prohibit upward movement of the guide protrusion.

12 Claims, 4 Drawing Sheets

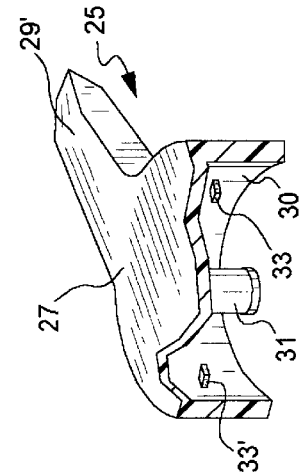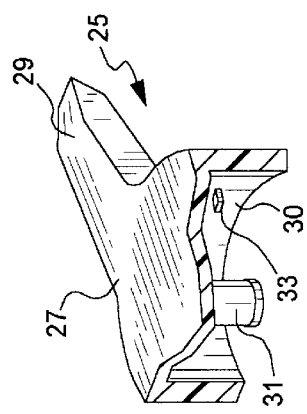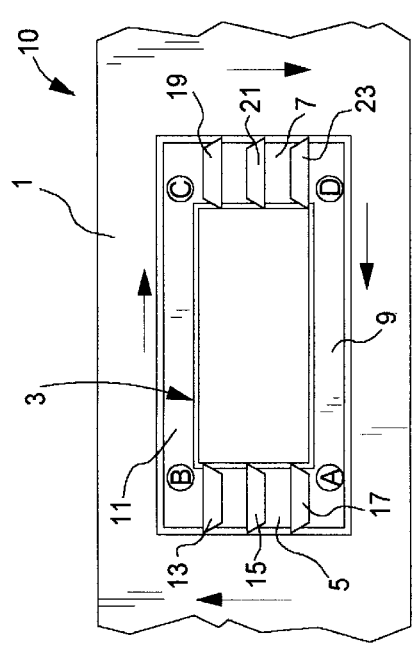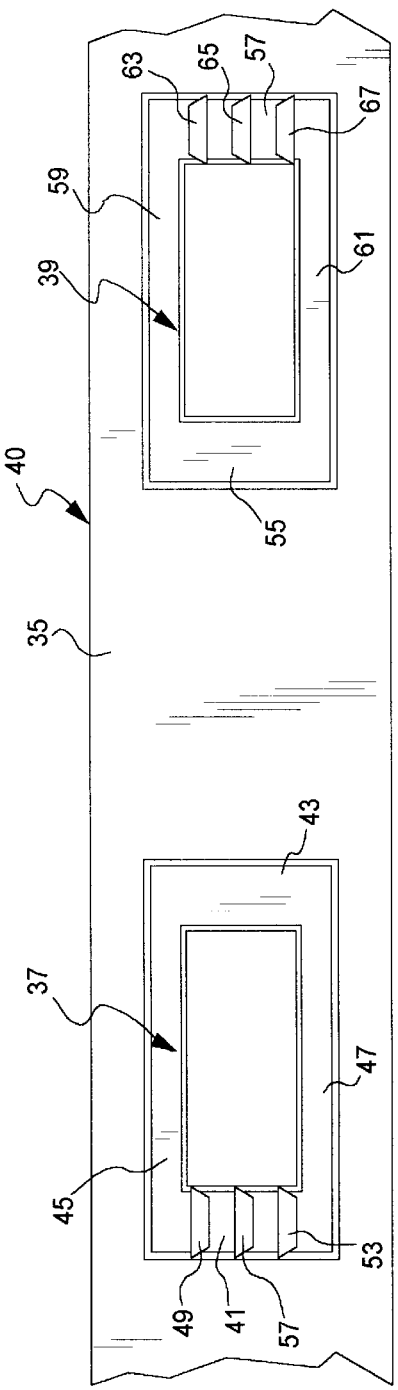

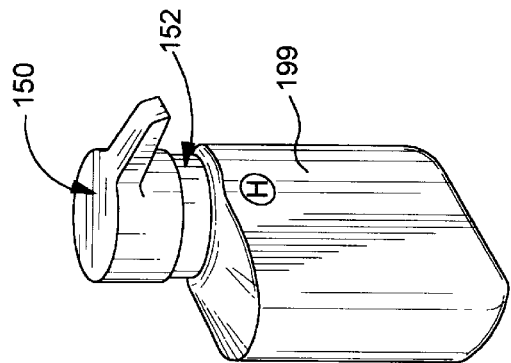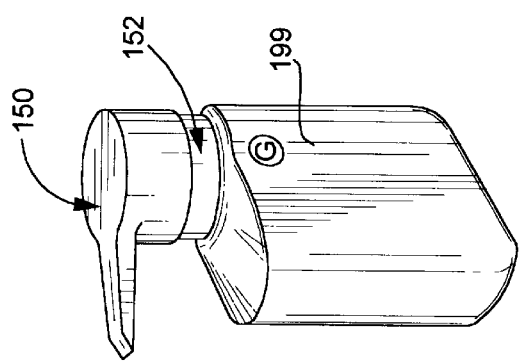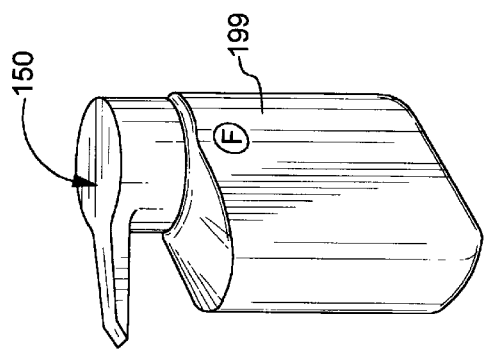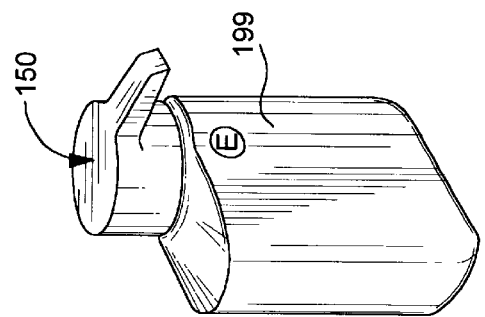

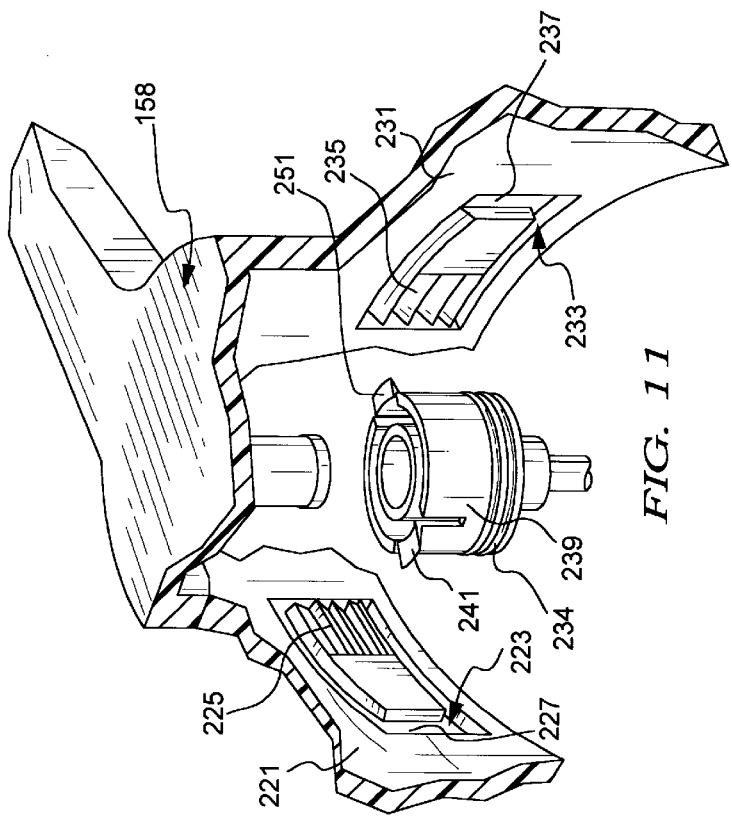
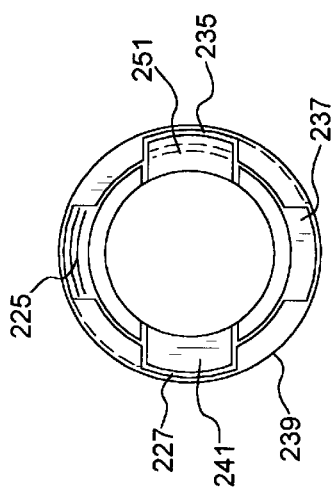
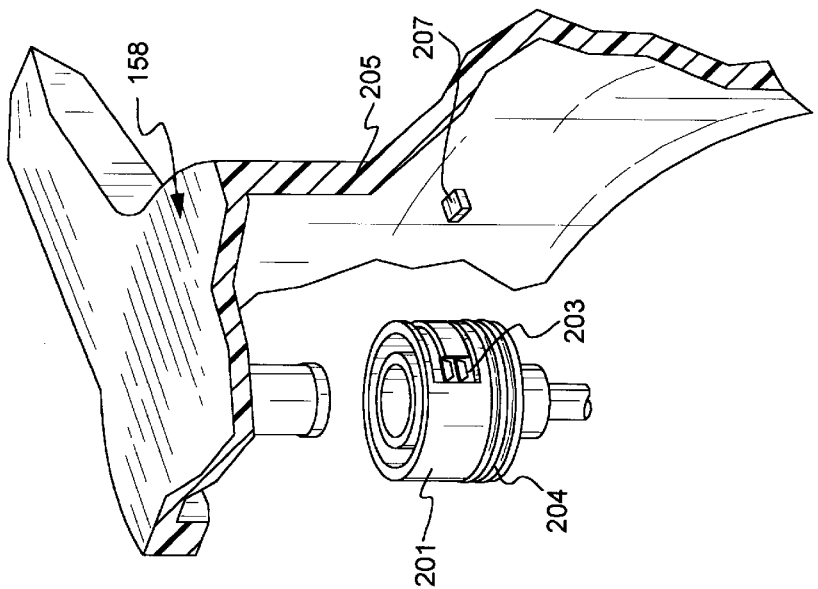

METERED DOSAGE UNIDIRECTIONAL TRACKED PUMPED DISPENSER

BACKGROUND OF THE INVENTION

1. Field of the Invention

The present invention relates to liquid pump dispensers and more particularly to such pump dispensers where dosage dispensing is important and prevention of overdosing or underdosing is also important. Thus, the present invention involves such dispensers that require complex movements for each dosage dispensation to avoid an accidental second pumping or an accidental underpumping.

2. Information Disclosure Statement

The following patents are examples of the prior art relating to dispensing mechanisms including metered dispensers:

U.S. Pat. No. 5,615,806 to Grothoff describes a pump dispenser which has a plunger lock-up feature in which the plunger is positively retained against dislodgement by cradling projections on the piston stem against abutment shoulders of a locking sleeve which is fixed within the pump body of the dispenser. The pump body may be of an integral one-piece construction with the container closure, and the container vent opening is controlled by an upstanding sleeve on the piston cup for preserving the integrity of the piston seals.

U.S. Pat. No. 5,277,334 to Malinconico describes an acquisition device of a discharge apparatus which is operated by a servodrive, which has at least one control cam constantly engaging in cam path. The control cam is directly provided on the actuating cap for the discharge actuator, while the cam path is located on the circumference of a fastening cap for the discharge feeder, so that no additional component is required for forming the acquisition device.

U.S. Pat. No. 4,915,601 to Schuckmann describes a dosaging pump which can be placed, in particular, on bottles or the like, having a pump bellows and two valves, one of which is associated with the inlet side and the other with a nozzle. The nozzle-side vale-closure member is seated in the cover of a cap which grips over the pump bellows. A cup surrounds the pump bellows, the inlet-side valve-closure member being seated in the bottom of the cup. End portions of the pump bellows are seated on separate collars of the cup and the cap, the cap and cup being moveable relative to each other during pumping, and the valve-closure members communicate with the interior of the bellows.

U.S. Pat. No. 4,589,574 to Foster shows serrations on the upper end of the pump body which are disposed for interlocking engagement with depending portions of the pump collar so that when the plunger is rotated in a counterclockwise direction to unlock the same from the collar in preparation for reciprocal operation, the collar is held securely by the body against rotation to assure unlocking. The serrations take the form of plurality of equally circumferentially spaced ramps which are inclined in the direction of locking rotation of the plunger to thereby permit the collar to yieldably override the serrations when the locked plunger and collar are rotated as a unit in the locking direction relative to the body to orient a spout of the plunger in a desired location for factory packaging efficiency.

U.S. Pat. No. 4,589,573 to Tada describes a head depression type dispenser which comprises a cylinder formed of an elastic material such as rubber. The cylinder is arranged between a head and a cap, and is constructed to operate as a piston for sucking and pressurizing liquid by axial deformation of the cylinder upon movement of the head. When the depressing force applied to its head is removed after the cylinder is deformed, the cylinder will return to the original shape by its own elasticity. In addition, a sealing piece extends from the cylinder into the passage of the head, thereby closely contacting the inner wall of the passage to form a secondary valve. The sealing piece becomes isolated from the inner wall of the passage when the hydraulic pressure in the cylinder exceeds the elasticity of the sealing piece, allowing the flow of the compressed liquid through the passage, and closely contacts the inner wall of the passage by the elasticity of the sealing piece when the hydraulic pressure is becomes lower than the elasticity of the sealing piece. Since the cylinder can deform in its axial direction, it can be sufficiently deformed, thereby sufficiently pressurizing the liquid to a high pressure.

U.S. Pat. No. 3,422,996 to Lipman describes an actuator cap which is intended for use on hand-held dispensers such as pump-type or pressurized aerosol cans, and comprises a depress button which is vertically movable in a stationary cap attachable to the container of the dispenser. The button is also turnable between limits, and is blocked against downward movement for all of its rotative positions except the position defined by one of said limits.

Notwithstanding the prior art, the present invention is neither taught nor rendered obvious thereby.

SUMMARY OF THE INVENTION

A metered dosage unidirectional tracked pump dispenser of the present invention comprises a liquid pump which includes a pump handle and nozzle, and a circular housing containing a reciprocal pump mechanism which is connected to the nozzle. A circular sleeve, which may be a container neck, the housing, a pump handle wall or a separate component, is included and has either at least one guide protrusion, or has at least one track located on the said sleeve, the track being adapted to receive the guide protrusion. The track has a virtual continuous loop for control of pump cycles. There are also at least two vertical paths parallel to and separate from each other. One of the vertical paths has upward flowing ratchets which permit movement of a guide protrusion upwardly and prohibit downward movement. The other of the vertical paths has downward flow ratchets which permit movement of a guide protrusion downwardly and prohibit upward movement of the guide protrusion.

BRIEF DESCRIPTION OF THE DRAWINGS

The present invention should be more fully understood when the specification herein is taken in conjunction with the drawings appended hereto wherein:

FIG. 1 shows a rolled-out partial front view of a wall of a sleeve utilized in conjunction with a present invention pump handle, and FIG. 2 shows a front oblique partial cut view of a liquid pump handle which operates in conjunction with the sleeve shown in FIG. 1;

FIG. 3 shows a rolled-out partial front view of an alternative embodiment present invention pump dispenser sleeve wall with two tracks, utilized in conjunction with the pump handle shown in FIG. 4, or alternatively, with another corresponding component, and is shown in an oblique front view;

FIGS. 6, 7, 8 and 9 show front oblique views of a container with the present invention dispenser of FIG. 5 connected thereto in various operational positions along the continuous track shown in FIG. 5;

FIG. 10 shows another alternative embodiment present invention pump dispenser blown apart front oblique view wherein the continuous track is located on the housing of the pump rather than the sleeve; and, FIG. 11 shows another alternative embodiment present invention pump dispenser blown apart front oblique view wherein two tracks are utilized, and FIG. 12 shows a partial top view of the pump handle wall (sleeve) and housing shown in FIG. 11.

DETAILED DESCRIPTION OF THE PRESENT INVENTION

Figure 5:
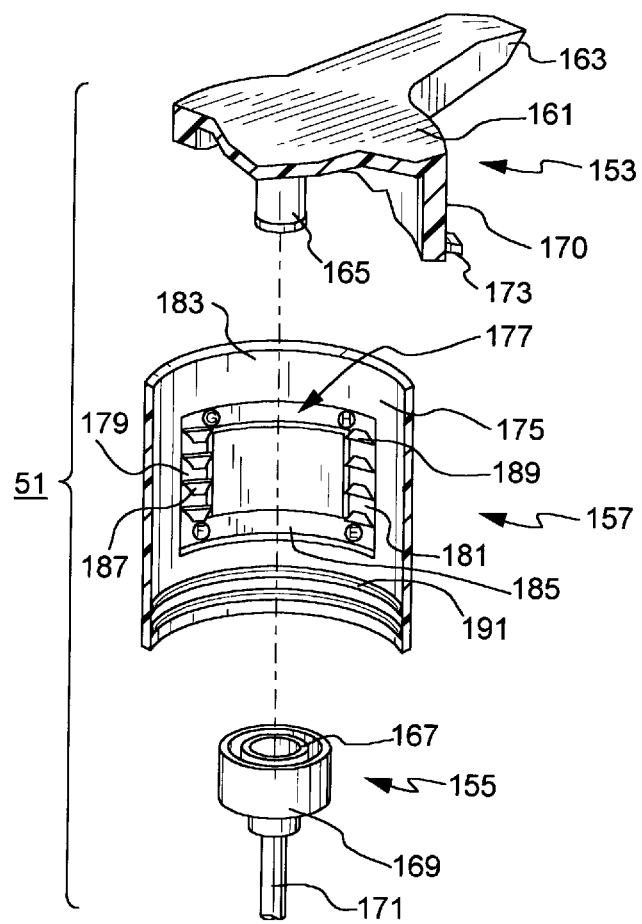
FIG. 5 shows a present invention pump dispenser in a blown apart front oblique view, including a nozzle handle, a cut portion of a handle wall, a sleeve and a liquid pump housing.

Many products today are dispensed through pump dispensers and in many cases consumers overshoot or simply over pump the product and waste materials or use more than they should. Additionally, in those instances where medications are involved, such over pumping can easily result in overdosing which can create serious problems or even be fatal to the user. Additionally, when a user pumps medication from a conventional dispenser, underdosing occurs and efficacy of the medication is compromised. Thus, the present invention is directed to reducing or eliminating over pumping or under pumping of liquid products which are typically dispensed through hand pump containers. More specifically, the present invention involves the use of a continuous loop through which a user must pass a pump handle to achieve the complete cycle of an upward and downward stroke which is involved in the pumping process.

Inherently, hand pump and other pump products have a stroke cycle which repeats itself with the same length of stroke and, therefore, the same volume of dispensing for each stroke. In other words pumps are generally inherently meter dispensers because they dispense a predictable amount of material with each cycle. Sometimes, however, the user will not push down all the way or will repeat a pump cycle before the upward stroke is completed. In these cases, without a complete upward and downward stroke, a repeat metered volume dispensing is not achieved. Thus, the present invention is also directed to controlling the pump in such a way that the user always completes the upward stroke and the downward stroke.

The present invention generally relies upon any conventional pumping mechanism and, in addition, two critical elements to achieve the objectives of the present invention. The first element is at least one protrusion on either the housing of the pump mechanism or on a sleeve, and the other is the continuous loop mentioned above through which the protrusion travels. Thus, the present invention relies upon a dispenser with any conventional pump mechanism with a housing, and which has been adapted to include at least one protrusion and a continuous loop with a track, which fits into one another to cause the user to move vertically, horizontally, vertically and horizontally through each cycle.

Referring now to FIG. 1 there is shown a partial front flattened out view of the one side of a sleeve which may be used in conjunction with a pump dispenser handle wall containing a protrusion. In this case the track would be on an outside wall. (If it were to be used with a pump mechanism housing, it would be an inside wall.) Thus, wall 1 of the sleeve 10 includes a track 3 which is recessed and contains four connected paths which form a continuous loop. Upward flowing vertical path 5 is connected to horizontal open path 11 which is connected to downward flowing vertical path 7 which is connected to horizontal open path 9 which connects back to vertical path 5 to form the continuous loop. Upward flowing vertical path 5 contains a plurality of one-way upward flowing ratchets such as ratchets 13, 15 and 17. In this vertical path 5, a ratchet can move from point A to point B in an upward fashion but can not be moved downwardly because of the one-way ratcheting. A protrusion may then be moved along horizontal path 11 and downwardly along vertical path 7. As can be seen, vertical path 7 contains one-way downward flowing ratchets such as ratchets 19, 21 and 23. Finally, the protrusion may then move along horizontal open path 9 to return to the bottom of upward flowing vertical path 5. In other words a protrusion may travel within track 3 by moving from A to B to C to D but not the reverse. This will result in a user being able to only push down at a particular vertical location and then must rotate the mechanism so that it moved to another location in order to be lifted upward. Once its lifted upwardly, it can not be pushed back down without again being moved back to another position to enable downward flow or movement. Thus, the upstroke occurs in one position and a downstroke occurs in a separate position. Typically these two positions may be 90° or 120° or 180° apart. Clearly, whatever separation over the span of the sleeve that the separate upward flowing vertical path and downward flowing vertical path may be situated, would dictate the separation between the protrusions.

FIG. 2 shows a liquid pump handle and nozzle component 25 in its front oblique view with its handle top 27 having a nozzle 29 and a wall 30 which contains a protrusion 33 on its inside. Pump mechanism connector 31 is also included. In this case, protrusion 33 would travel along path 3 of the wall 1 of the sleeve shown in FIG. 1. In other words, when the sleeve 10 shown in FIG. 1 is in the form of a circle about a pump mechanism housing and protrusion 33 of component 29 is located in path 3, and sleeve 1 is attached to or formed as part of a container, sleeve 10 will not be moveable, and component 29 is moveable and connected to a pump mechanism, the separate locations for the upward and downward stroke are achieved.

FIG. 1 illustrates a single continuous loop. However, the present invention results may be achieved by using two or more loops which together create a virtual continuous loop and this is illustrated in FIG. 3. Here a front view of wall 35 of a sleeve 40 is illustrated with two separate loops, namely, first loop 37 and second loop 39. First loop 37 has an upward flowing vertical path 41 but no downward flowing vertical path. It has horizontal paths 45 and 47 as shown and an open vertical path 43. If a single protrusion were located in first loop 37 a pump could be reciprocated in the single open vertical path 43 but could only move upwardly in the upward flowing vertical path 41 due to one-way ratchets 49, 51 and 53. However, when used in conjunction with a double protrusion housing, wherein one such protrusion is located in first loop 37 and the other in second loop 39, the results described above are readily achieved. Second loop 39 contains an open vertical path 55 and horizontal paths 59 and 61 but with a one-way downward flowing vertical path 57 with one-way ratchets 63, 65 and 67. When the sleeve 40 shown in FIG. 3 is formed into a circular arrangement and protrusions are set therein, it can be seen that the pump handle and nozzle component 29' shown in FIG. 4 with protrusions 33 and 33' would properly function therewith. (Also, note that like parts shown in FIGS. 2 and 4 are identically numbered.)

The artisan, should now realize that numerous variations are possible for the present invention. For example, as shown in FIG. 3, two loops are utilized. These loops have only one set of ratchets each without exceeding the scope of the present invention, these loops could both have two sets of ratchets—one each for upward flow and one each for downward flow. Further, more than two loops could alternatively be used. Finally, one or more loops could receive protrusions for loop control movement of the handle, and the actual ratchets for controlling upward and downward movement could be located outside of the loops and have their own corresponding protrusions to control upward and downward movement.

FIG. 5 shows a blown part, oblique front view of a present invention dispenser wherein pump handle 153, sleeve 157 and liquid pump housing 155 are illustrated. Pump handle 153 includes a pump handle top 161, a nozzle 163 which is connected to stem 165 adapted to fit within pump mechanism 167 and attached to a conventual pump rod (not shown), and a wall 170 with a protrusion 173. Liquid pump housing 155 includes an outside housing wall 169, a pump mechanism guide 167, a dip tube 171, extending protrusion 173.

Outwardly extending protrusion 173 of wall 170 is specifically adapted to ride within track 177 from point E to point F to point G to point H of sleeve 157. Thus, inside wall 175 of sleeve 157 has a track 177 which includes upward flowing vertical path 179, downward flowing vertical path 181 and horizontal paths 183 and 185. One-way upward flowing ratchets such as ratchet 187 is included in upward flowing vertical path 179 and one-way downward flowing ratchets such as ratchet 189 are included in downward flowing vertical path 181. In this particular embodiment, pump handle wall 170 fits inside sleeve 157 and functions as stated. Track 177 could be on the outside of sleeve 157, pump handle wall 170 could fit outside sleeve 157 and protrusion 173 could be on the inside to achieve the same results. Additionally, in this embodiment, sleeve 157 has threads such as thread 191 for attachment to a container. In the alternative, sleeve 157 may be molded within the container during its formation and pump handle 153 with pump 155 may be fixedly fitted therein and handle 153 moveably fitted therein.

Referring now to FIGS. 6, 7, 8 and 9 collectively, there is shown a front oblique view of a container 199, a pump handle 150 and sleeve 152. FIGS. 6, 7, 8 and 9 should be viewed in conjunction with FIG. 5 described above and, more particularly, with the nozzle 153 and track 177 shown in sleeve 157 of FIG. 5 but wherein the track is on the outside, the protrusion on the inside and nozzle 153 fits outside sleeve 157. Further, the letters E, F, G and H in FIG. 5 correspond to those letters respectively in FIGS. 6 through 9. As can be seen, in FIG. 6, pump handle 150 is in its downward position protruding outwardly, this is because it is unable to move back up, even if spring loaded due to the ratchets. In FIG. 7, it is rotated 90° so as to point to the left. At this point, the inside protrusion is aligned with the upwardly flowing ratchets of sleeve 152 and, as shown in FIG. 8, it may be lifted up in this position or will be spring forced upwardly. It must then be rotated back to the position where pump handle 150 is located outwardly and, then, as shown in FIG. 9 may be pressed downwardly so as to dispense liquid. Once it is pressed downwardly, it will be once again inherently in the start position shown in FIG. 6 and the user must repeat the same steps to get a second stroke. It should be now clear from these Figures that a user will complete an entire stroke for a metered amount of liquid without over or under pumping and without using a second stroke unless continuously going through the steps to do so.

Alternative embodiments of the present invention are shown in FIGS. 10 through 12. Pump handles 158 and 168 shown in FIGS. 10 and 11 respectively, are essentially identical in function. In FIG. 10 housing 201 has a track 203 located thereon and pump handle wall 205 (acting as a sleeve) includes a protrusion 207 which would nest in track 203 and will follow track 203 to achieve the same kind of cycling shown in FIGS. 6 though 9 above. Non-reversible threads 204 are included on housing 201 for fixed attachment of housing 201 to a container neck.

Shown in FIG. 11 is an alternative embodiment wherein the housing 239 includes two protrusions 241 and 251 and the handle wall acting as a sleeve is shown in two segments, namely wall segments 221 and 231. These wall segments have tracks 223 and 233 respectively. These each receive protrusions 241 and 251 and, work together in harmony to form a virtual continuous loop. Thus, track 223 has an open vertical path 227 but an upward flow path 225. Obversely, track 223 has an open vertical path 237 and a downward flowing vertical path 235. Housing attachment means 234 are located on the lower outside portion of housing 239.

FIG. 12 shows a partial top view of the device shown in FIG. 11 wherein identical parts are identically numbered. Note that the protrusions 241 and 251 are opposite and when one is in a ratcheted section or path the other is not, and vice versa.

Obviously, numerous modifications and variations of the present invention are possible in light of the above teachings. For example, while the invention is described in terms of vertical and horizontal paths, other shapes could achieve the same results without exceeding the scope of the present invention, e.g. the vertical or horizontal paths could be not exactly vertical or horizontal, such as sloped, tilted or waved, and would still be construed to be within the definitions of "vertical" and "horizontal". It is therefore understood that within the scope of the appended claims, the invention may be practiced otherwise than as specifically described herein.

What is claimed is:

1. A metered dosage unidirectional tracked pump dispenser, which comprises:
    (a) a liquid pump housing containing a reciprocal pump mechanism connected to a nozzle;
    (b) a stationary sleeve fitted about said housing; and,
    (c) a pump handle and nozzle connected to a reciprocal pump mechanism and having a wall extending downwardly in parallel with said sleeve and adjacent thereto;
        one of said pump handle wall and said sleeve having at least one guide protrusion extending into the other of said pump handle wall and said sleeve; and,
        the other of said pump handle wall and said sleeve having at least one track located thereon and receiving said guide protrusion, said track having a virtual continuous loop with two vertical paths parallel and separate from each other and with two horizontal paths, one connecting tops of said two vertical paths and one connecting bottoms of said two vertical paths, one of said vertical paths having upward flowing ratchets which permit movement of said guide protrusion upwardly and prohibit downward movement of said guide protrusion, the other of said vertical paths having downward flow ratchets which permit movement of said guide protrusion downwardly and prohibit upward movement of said guide.

2. The metered dosage unidirectional tracked pump dispenser of claim 1 wherein said stationary sleeve is a container neck.

3. The metered dosage unidirectional tracked pump dispenser of claim 1 wherein said stationary sleeve is attachable to a container.

4. The metered dosage unidirectional tracked pump dispenser of claim 1 wherein said stationary sleeve is integrally formed as part of said housing.

5. The metered dosage unidirectional tracked pump dispenser of claim 4 wherein said guide protrusion is located on said housing and said track is located on the inside of said pump handle wall.

6. The metered dosage unidirectional tracked pump dispenser of claim 4 wherein said guide protrusion is located on the inside of said pump handle wall and said track is located on the outside of said housing.

7. The metered dosage unidirectional tracked pump dispenser of claim 4 wherein said housing and said sleeve are circular and said track vertical paths are approximately 90° apart.

8. The metered dosage unidirectional tracked pump dispenser of claim 5 wherein said housing and said sleeve are circular and said track vertical paths are approximately 90° apart.

9. The metered dosage unidirectional tracked pump dispenser of claim 1 wherein there are two tracks and two corresponding guide protrusions.

10. The metered dosage unidirectional tracked pump dispenser of claim 9 wherein one of said two tracks contains upward flow ratchets and no downward flow ratchets, and the other of said two tracks contains downward flow ratchets and no upward flow ratchets such that, together, said two tracks form a vertical continuous loop.

11. The metered dosage unidirectional track pump dispenser of claim 10 wherein said sleeve and said housing are circular and said two tracks are approximately 180° opposed to one another.

12. The metered dosage unidirectional track pump dispenser of claim 1 wherein said sleeve is threaded and is threadably attachable to a container neck.

* * * * *